US011706187B2

(12) United States Patent
Bouvet

(10) Patent No.: US 11,706,187 B2
(45) Date of Patent: Jul. 18, 2023

(54) METHOD AND DEVICE FOR PROCESSING A REQUEST FOR ANONYMISATION OF A SOURCE IP ADDRESS, METHOD AND DEVICE FOR REQUESTING ANONYMISATION OF A SOURCE IP ADDRESS

(71) Applicant: Orange, Issy-les-Moulineaux (FR)

(72) Inventor: Bertrand Bouvet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 47 days.

(21) Appl. No.: 17/610,923

(22) PCT Filed: May 5, 2020

(86) PCT No.: PCT/EP2020/062386
§ 371 (c)(1),
(2) Date: Nov. 12, 2021

(87) PCT Pub. No.: WO2020/229219
PCT Pub. Date: Nov. 19, 2020

(65) Prior Publication Data
US 2022/0224669 A1    Jul. 14, 2022

(30) Foreign Application Priority Data

May 13, 2019 (FR) ...................... 1904960

(51) Int. Cl.
*H04L 61/2514* (2022.01)
*H04L 61/59* (2022.01)
(Continued)

(52) U.S. Cl.
CPC ...... *H04L 61/2514* (2013.01); *H04L 61/2517* (2013.01); *H04L 61/2539* (2013.01); *H04L 61/59* (2022.05)

(58) Field of Classification Search
None
See application file for complete search history.

(56) References Cited

U.S. PATENT DOCUMENTS 7,391,768 B1    6/2008 Samprathi et al.
9,825,911 B1 *  11/2017 Brandwine ............. H04L 63/20
(Continued)

OTHER PUBLICATIONS

International Search Report and Written Opinion dated Jun. 30, 2020 for Application No. PCT/EP2020/062386.
(Continued)

*Primary Examiner* — Angela Nguyen
(74) *Attorney, Agent, or Firm* — Knobbe, Martens, Olson & Bear, LLP

(57) ABSTRACT

A method for processing a request for anonymisation of a source IP address of an IP packet is described, the IP packet being transmitted by a transmitting device to a recipient device via a communications network, the transmitting device being connected to the network via a network terminal apparatus. The method is carried out by an anonymisation device positioned for cutting the flow between the network terminal apparatus and the recipient device, and comprises receiving the packet; establishing whether the source IP address has to be anonymised or not; if a result of the verification is negative, routing the packet to the recipient device; if the result of the verification is positive and if the anonymisation device has an address translation function: replacing the source IP address with an IP address of the anonymisation device; and. If the result of the verification is positive and if the anonymisation device does not have an address translation function, a step of routing the IP packet is routed to the recipient device via an apparatus of the network which has an address translation function.

19 Claims, 4 Drawing Sheets

(51) Int. Cl.
*H04L 61/2517* (2022.01)
*H04L 61/2539* (2022.01)

(56) References Cited

U.S. PATENT DOCUMENTS

| | | | |
|---|---|---|---|
| 2012/0057595 A1* | 3/2012 | Awano | H04L 63/0421 370/392 |
| 2014/0245421 A1* | 8/2014 | Lyon | H04L 63/1416 726/11 |
| 2017/0155678 A1 | 6/2017 | Araújo et al. | |

OTHER PUBLICATIONS

Lexi Pimenidis, et al., "Transparent Anonymization of IP Eased Network traffic" NORDSEC 2005, Tartu, Estonia, Oct. 20, 2005, Revised Oct. 21, 2005, pp. 116-121.

* cited by examiner

[Fig. 1]
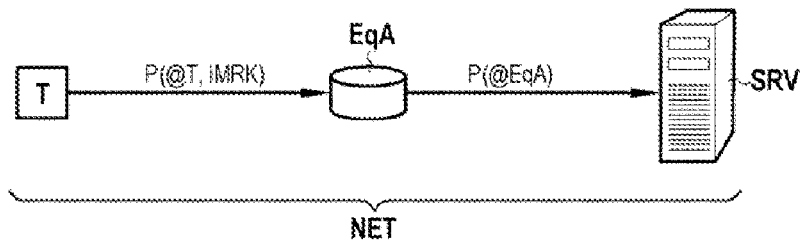
[Fig. 2]
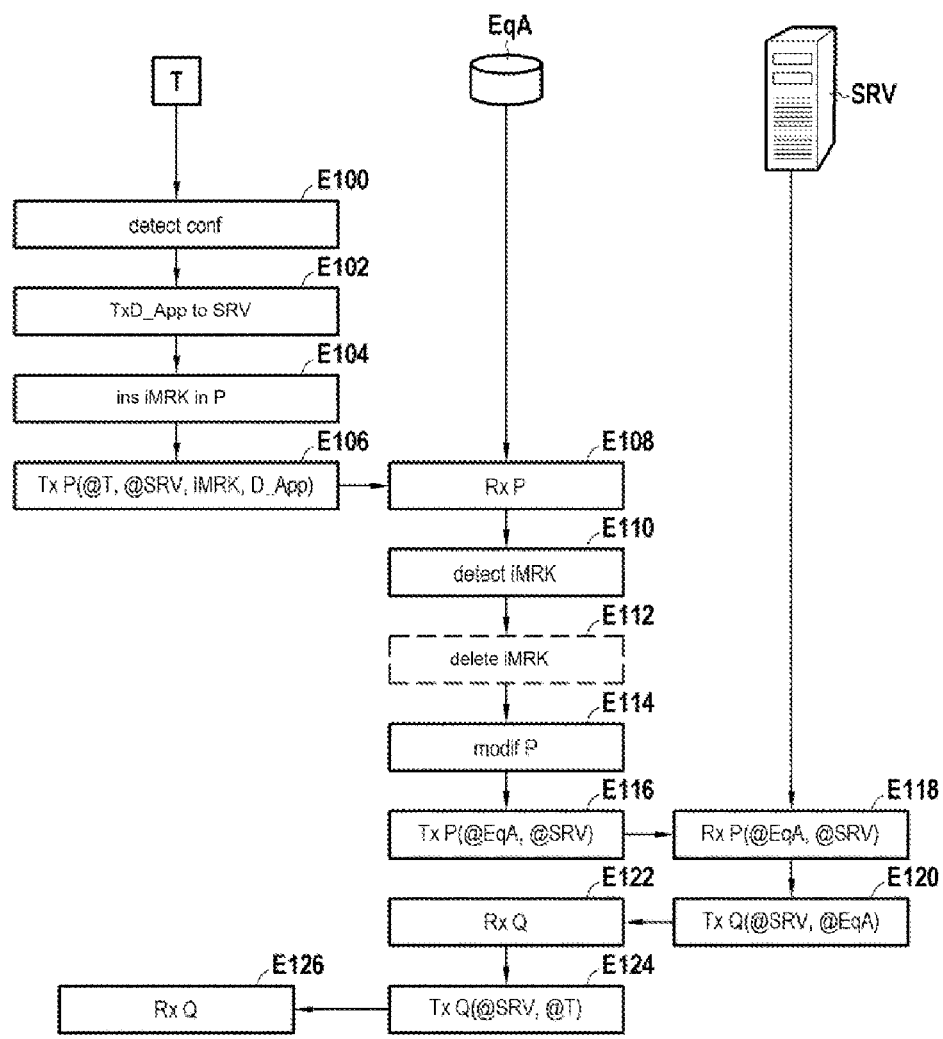

[Fig. 3]
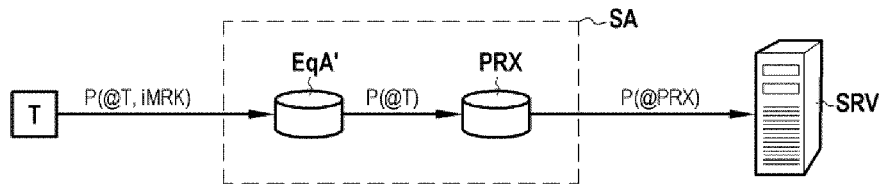
[Fig. 4]
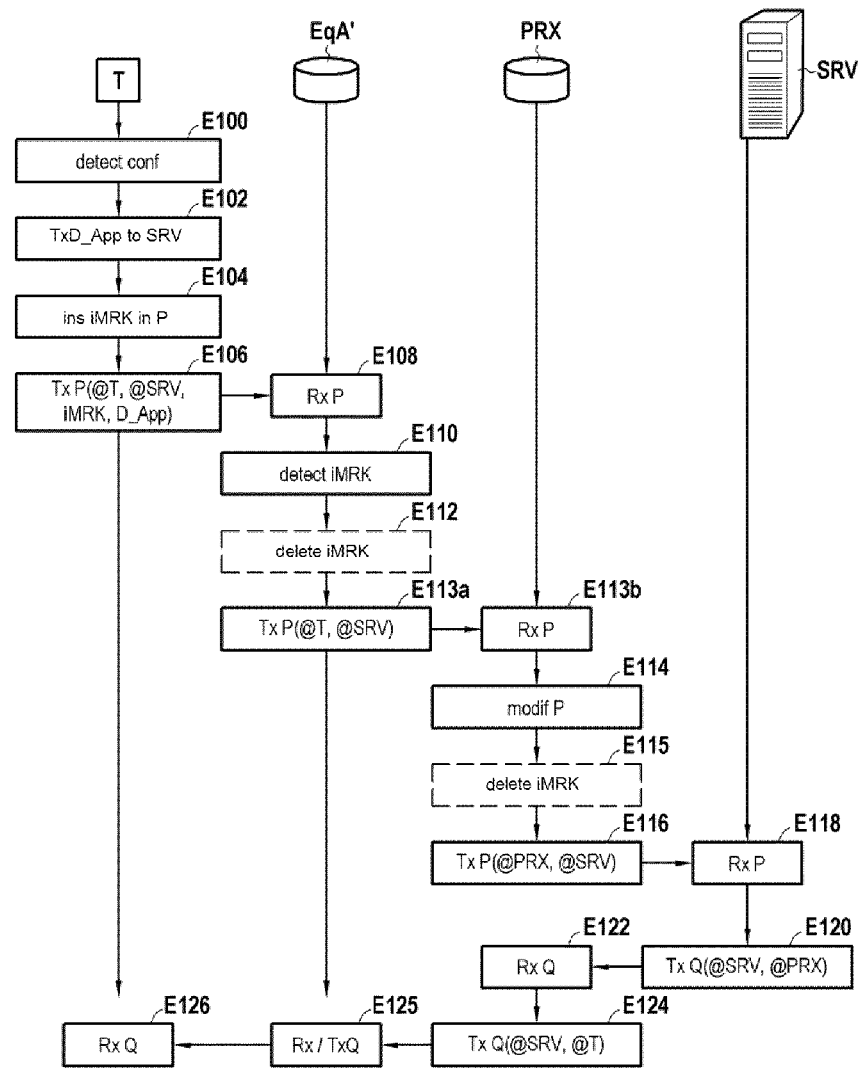

[Fig. 5]
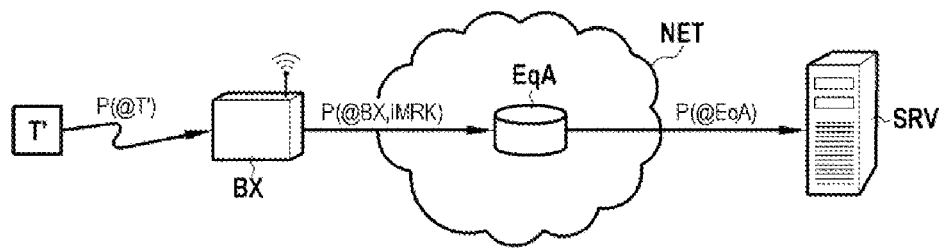
[Fig. 6]
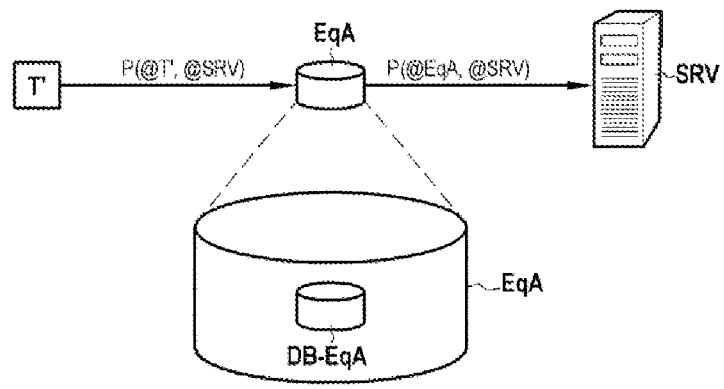
[Fig. 7A-7B]
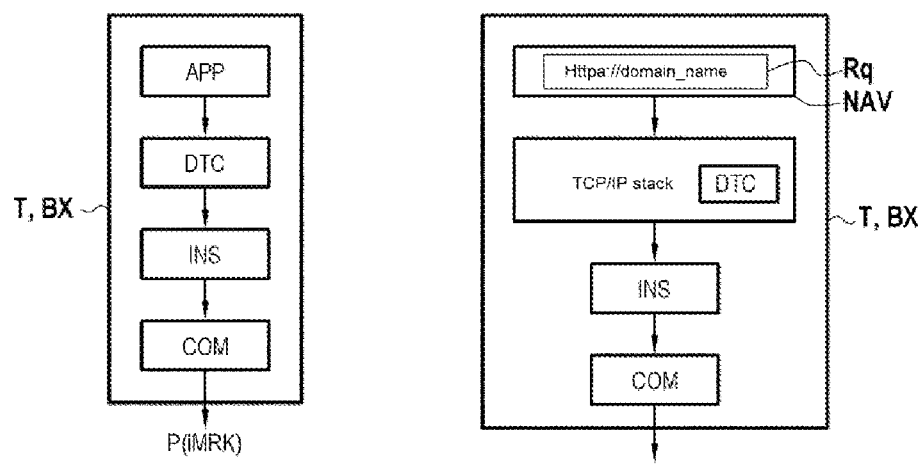
[Fig. 7A]   [Fig. 7B]

[Fig. 8A-8B]
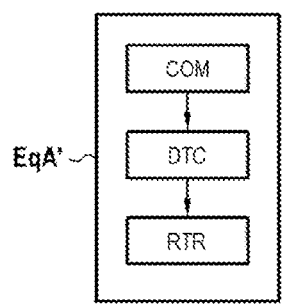
[Fig. 8A]
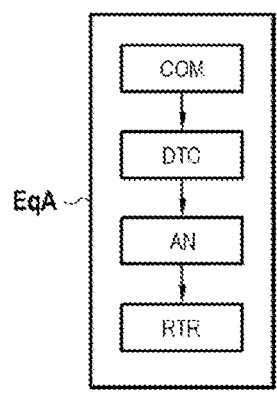
[Fig. 8B]
[Fig. 9]
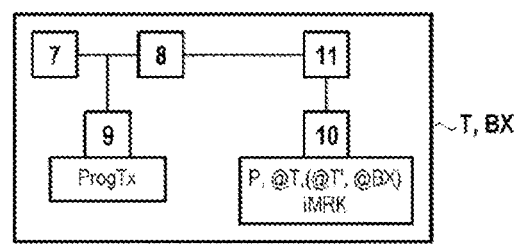
[Fig. 10]
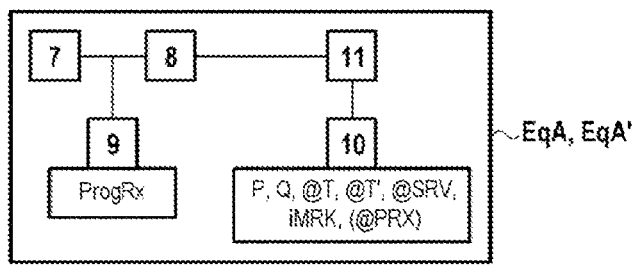

METHOD AND DEVICE FOR PROCESSING A REQUEST FOR ANONYMISATION OF A SOURCE IP ADDRESS, METHOD AND DEVICE FOR REQUESTING ANONYMISATION OF A SOURCE IP ADDRESS

RELATED APPLICATIONS

This application is the U.S. National Phase of Application No. PCT/EP2020/062386 entitled "METHOD AND DEVICE FOR PROCESSING A REQUEST FOR ANONYMISATION OF A SOURCE IP ADDRESS, METHOD AND DEVICE FOR REQUESTING ANONYMISATION OF A SOURCE IP ADDRESS" and filed May 5, 2020, which claims the benefit of French Patent Application No. 1904960, filed May 13, 2019, each of which is incorporated by reference in its entirety.

PRIOR ART

The invention relates to the general field of telecommunications. It relates more particularly to the field of anonymization of parameters relating to an IP traffic transmitter.

When a terminal sends an IP packet to a recipient device, that device can use parameters from that packet to obtain information items about the terminal and about the user of the terminal.

As examples, the source IP address of this IP packet can constitute an indication on the geolocation of the terminal or on the operator with which the terminal is subscribed. The source port number of the packet may, in some cases, be indicative of the application that generated that packet. The http field "User Agent" present in a web application layer header encapsulated in the IP packet represents an information item on the web browser installed on the terminal and used during the generation of the IP packet by the terminal. The field "Referer", if also present in a web application layer header, includes an identifier of a website visited by the user of the terminal and from which a request for the current web session was generated. Likewise, the field "cookies", if present in a web application layer header, allows the consulted websites to track a great deal of information items on the terminal, for example allowing contextual advertising to be pushed to the browser of the terminal based on other websites already visited or else to generate personal data of use such as the counting of web pages consulted or the frequency of access to a website.

In particular, the address MAC concatenated with a prefix IPv6 includes an information item on the manufacturer of the terminal or on its network interface card.

The device receiving the IP packet can use the information items deduced from the parameters of the IP packet to send targeted data to the terminal, for example advertisements according to the geolocation of the terminal. The user of the terminal does not necessarily wish to receive this data or targeted advertising; he may consider that this constitutes an invasion of his privacy.

The receiving device can also use the information items obtained from the parameters of the IP packet in a malicious manner, for example to hack personal information items of the user of the transmitter terminal.

There is therefore a need to be able to anonymize some parameters of IP traffic generated by the terminal, in particular the source IP address of the IP traffic.

In IPv4 addressing, a solution based on an address translation function NAT (for "Network Address Translation") or NAPT (for "Network Address Port Translation") is known.

When the NAT or NAPT function is implemented by a network terminal apparatus to which the terminal is connected, it may also be necessary to anonymize the IP address of the network terminal apparatus because it can give an indication on the geolocation of the terminal and on the Internet provider with which an Internet subscription is subscribed to connect the apparatus. Therefore, this solution is not satisfactory.

It is also noted that this solution is not possible for an IPv6 addressing.

Another solution is known, applicable in IPv4 and in IPv6, which consists in positioning a proxy server in the network, for cutting the flow between the terminal and the recipient device. When this proxy server receives an IP packet, it replaces the source IP address of that IP packet with its own IP address, then forwards the IP packet to the recipient device.

The proxy server can also replace the source port number of the IP packet by its output port number.

The proxy server allows to hide the IP address and the port number of the terminal from the recipient device, these information items being replaced by its own. Unlike a network terminal apparatus which implements a NAT or NAPT function, the IP address of the proxy server does not constitute an indication of the location of the terminal.

The proxy server can also modify, delete, or even add the content of some protocol fields of the application layers, that is to say parameters included in headers of the application layers, encapsulated in the IP packet. For example, the proxy server can modify the value of the "User Agent" field or the value of the "Referer" field. The proxy server integrates an ALG (for "Application Layer Gateway") type function to modify, delete or add content to the application layer headers.

However, using a proxy server requires configuring proxy server parameters within a web browser of the terminal, so that the traffic transmitted by the terminal to the recipient device passes through the proxy server. The terminal browser configuration includes a registration of the IP address (or an FQDN name, for "Fully Qualified Domain Name") and the recipient port number of the proxy server.

These proxy server parameters (IP address and port number) are not always provided by the network operator to terminal users.

In addition, such a configuration requires that the user of the terminal has certain technical knowledge. This solution then has implementation difficulties for the general public. That is why, the use of Proxy applies mainly in companies.

It should also be noted that the configuration of the proxy server has to be done at the terminal, for each web browser installed on the terminal.

Another disadvantage of using a proxy server is that this solution only applies to applications for which it is possible to configure the proxy server, typically Internet browser applications. In particular, this solution does not apply to mobile applications operating totally or partially in WebView mode. It is recalled that an application which operates in WebView mode allows to download the content of web pages available on a web server and to display them within the human machine interface of the application itself.

Another disadvantage of using a proxy server is that this solution only applies to a limited number of application level protocols such as HTTP (for "Hyper Text Transfer Protocol"), FTP (for "File Transfer Protocol").

Another solution is to install VPN (for "Virtual Private Network") client software at the terminal and to route all the IP traffic sent by the terminal, that is to say from all the applications present on the terminal, regardless of the application protocol, to a recipient device via a VPN server. The VPN server works basically the same way as a proxy server but in addition, the traffic exchanged between the VPN client installed on the terminal and the VPN server is encrypted in both directions of IP traffic. An IP tunnel is created between the VPN client of the terminal and the VPN server, in which the IP packets are encapsulated and encrypted.

This solution has disadvantages similar to those of the solution based on the use of a proxy server: need to download and then configure VPN client software at the terminal with the IP address and the port number of the VPN server.

In addition, the VPN solution has other disadvantages: VPN softwares are generally chargeable, they do not guarantee any quality of service; these VPN softwares do not allow any processing at the application layers to be able to modify and/or delete and/or add information items such as the User Agent, Referer, or Cookies fields; traffic encryption prevents the network operator from legally intercepting this traffic; encryption and decryption require memory, CPU computing capacity and computing time, which leads to excess power consumption, excess IP packet transfer latency; encapsulating the packets sent by the terminal to be sent via the IP tunnel increases the transfer latency of these packets and may require more bandwidth at the access network. Furthermore, some VPN service providers may themselves analyze decrypted IP traffic of their users and themselves resell and/or exploit information items derived from this analysis of IP traffic.

There is therefore a need for a solution which allows to protect the personal data of the user of the terminal and which does not have the disadvantages of the solutions of the prior art.

DISCLOSURE OF THE INVENTION

The invention relates to a method for processing a request for anonymization of a source IP address of an IP packet transmitted by a transmitting device to a recipient device via a communications network, the transmitting device being connected to the network via a network terminal apparatus, the method being carried out by a device called anonymization device, which is positioned for cutting the flow between the network terminal apparatus and the recipient device. This method comprises:
 a step of receiving the IP packet;
 a verification step for establishing whether the source IP address of the IP packet has to be anonymized or not;
 if a result of the verification is negative, a step of routing the IP packet to the recipient device;
 if the result of the verification is positive and if the anonymization device has an address translation function:
  a step of replacing the source IP address with an IP address of said anonymization device; and
  a step of routing the IP packet to the recipient device;
 if the result of the verification is positive and if the anonymization device does not have an address translation function, a step of routing the IP packet to the recipient device via an apparatus of the network which has an address translation function.

The invention also relates to a method for processing a request for anonymization of a source IP address of an IP packet transmitted by a transmitting device to a recipient device via a communications network, the transmitting device being connected to the network via a network terminal apparatus, the method being carried out by a device called anonymization device, which is positioned for cutting the flow between the network terminal apparatus and the recipient device. This method comprises:
 a step of receiving the IP packet;
 a first verification step for establishing whether the source IP address of the IP packet has to be anonymized or not;
 if a result of the first verification is negative, a step of routing the IP packet to the recipient device;
 a second verification step for establishing whether or not the anonymization device has an address translation function;
 if the result of the first verification is positive and if the anonymization device has an address translation function:
  a step of replacing the source IP address with an IP address of said anonymization device; and
  a step of routing the IP packet to the recipient device;
 if the result of the first verification is positive and if the anonymization device does not have an address translation function, a step of routing the IP packet to the recipient device via an apparatus of the network which has an address translation function.

The invention also relates to a method for processing a request for anonymization of a source IP address of an IP packet transmitted by a transmitting device to a recipient device via a communications network, the transmitting device being connected to the network via a network terminal apparatus, the method being carried out by a device called anonymization device, not having an address translation function and being positioned for cutting the flow between the network terminal apparatus and the recipient device. This method comprises:
 a step of receiving the IP packet;
 a verification step for establishing whether the source IP address of the IP packet has to be anonymized or not;
 if the result of the verification is negative, a step of routing the IP packet to the recipient device;
 if the result of the verification is positive, a step of routing the IP packet to the recipient device via an apparatus of the network which has an address translation function.

Correspondingly, the invention relates to an anonymization device configured to process a request for anonymization of a source IP address of an IP packet transmitted by a transmitting device to a recipient device via a communications network, the transmitting device being connected to the network via a network terminal apparatus, said anonymization device being positioned for cutting the flow between the network terminal apparatus and the recipient device, the anonymization device comprising:
 a communication module configured to receive the IP packet;
 a verification module configured to establish whether the source IP address of the IP packet has to be anonymized or not; and
 a routing module configured to route the IP packet to the recipient device, the IP packet being routed via an apparatus of the network which has an address translation function if the anonymization device does not have an address translation function and if and only if a result of said verification is positive.

The invention also relates to an anonymization device configured to process a request for anonymization of a source IP address of an IP packet transmitted by a transmitting device to a recipient device via a communications network, the transmitting device being connected to the network via a network terminal apparatus, said anonymization device being positioned for cutting the flow between the network terminal apparatus and the recipient device, the anonymization device comprising:
- a communication module configured to receive the IP packet;
- a first verification module configured to establish whether the source IP address of the IP packet has to be anonymized or not;
- a second verification module configured to establish whether or not the anonymization device has an address translation function; and
- a routing module configured to route the IP packet to the recipient device, the IP packet being routed via an apparatus of the network which has an address translation function if the anonymization device does not have an address translation function and if and only if a result of said first verification is positive.

The anonymization device within the meaning of the invention is capable of detecting whether the source IP address of an IP packet has to be anonymized or not, but it does not necessarily carry out this anonymization itself.

In one embodiment, the anonymization device in accordance with the invention has an address translation module configured to replace the source IP address with an IP address of the anonymization device.

In another embodiment, the anonymization device may not include any address translation module or include an address translation module that is put on standby or configured not to operate under certain conditions.

The features and advantages of the method for processing an anonymization request according to the invention presented below apply in the same way to the anonymization device according to the invention and vice versa.

The anonymization device in accordance with the invention can carry out the method for processing an anonymization request in accordance with the invention.

The invention allows not to inform the recipient device and/or its user of the IP address of the transmitting device or of the network terminal apparatus. The recipient device and/or an application installed on the recipient device and/or the user of the recipient device will therefore not be able to deduce information items on the geolocation of the transmitting device, nor on the operator to which the transmitting device is subscribed.

When the anonymization device is not comprised in the recipient device, the source IP address of the IP packet is anonymized even for the recipient device.

When the anonymization device is comprised in the recipient device, the source IP address of the IP packet is replaced after reception of the IP packet by the network interface of the recipient device, and before the presentation of the packet to an application installed on the recipient device and/or the user of the recipient device.

The invention does not require configuration of information items necessary for the use of a proxy server or a VPN server at the transmitting device.

The invention allows to anonymize the source IP address of an IP packet, even if it has been generated by a mobile application operating partially or completely in WebView mode.

The invention allows to anonymize the source IP address of an IP packet, regardless of the type of terminal, regardless of the application that generated the IP packet, and regardless of the application protocol.

The network terminal apparatus can be the transmitting device per se, or a gateway for connecting the transmitting device to said communications network. Such a gateway is often marketed in France under the name of "box" and offers multiple services (telephony, Internet, television, . . . ), such as an apparatus LiveBox (product sold by Orange).

The transmitting device is a terminal such as a mobile phone of the smartphone type, a computer, a tablet, a connected object, or any other communicating device.

The transmitting device can also be a network terminal apparatus according to the invention.

In one embodiment, the verification step includes a query of a database to obtain, from the source IP address of the IP packet, a configuration information item relating to a subscription of the transmitting device to an anonymization service of the source IP address.

By way of example, the database queried may be of the SPR (for "Subscriber Profile Repository") type connected to an entity of the PCRF (for "Policy and Charging Rules Function") type, this PCRF type entity being itself connected to a PCEF (for "Policy and Charging Enforcement Function") type of an apparatus of PGW (for "Packet data network GateWay") type of a mobile network. The request for anonymization of the source IP address can be downloaded into the PCEF entity when creating the Access Point Name APN used by the application of the transmitting device having generated the IP packet, such as the access point name APN Internet.

The database queried may be an instance of the SPR type database, this instance being a copy in a database internal to an apparatus of the PGW type.

This embodiment allows to activate the implementation of the request processing method in accordance with the invention permanently for the IP traffic transmitted by the transmitting device. The recording of the request for anonymization of IP traffic for a user may have been carried out by an operator of the communications network, or upon subscription of the transmitting device or of the network terminal apparatus to an IUIR (for "Internet User Identifier Restriction" type service.

This embodiment ensures that neither the IP address of the transmitting device nor that of the network terminal apparatus will be disclosed to the application or to the user of the recipient device. This IP address will never be disclosed even to the recipient device if the anonymization device is not incorporated into the recipient device.

In another embodiment, the verification step includes a detection of a marking information item in a field of the IP packet, the marking information item being representative of the anonymization request.

This embodiment allows a user of the transmitting device to have control over the implementation of the request processing method in accordance with the invention. The user can select for which IP packets he wishes the processing method in accordance with the invention to be carried out.

It should be noted that finding and obtaining the marking information item by the anonymization device in accordance with the invention does not penalize the routing latency of the IP packet because in any event, the IP headers are handled, for example to find a source or recipient IP address, or a source or recipient port number, or for checksum consistency verification of the IP packet, etc.

It should also be noted that the impact of the invention on the MTU (for "Maximum Transmission Unit") criteria is not penalizing. It is recalled that the MTU criteria relate to the maximum size of an IP packet that can be transmitted at one time on a network segment. This is because the marking information item may only consume a single bit to represent an anonymization request.

In one embodiment, during the verification step, it is determined that the source IP address of the IP packet has to be anonymized if it has been previously determined that the source IP address of a previous IP packet of the same session should be anonymized.

It is recalled that an IP session is based on a source IP address, a transmission port, a recipient IP address, a recipient port and a transport protocol.

In this embodiment, once the IP session is established, when the anonymization device in accordance with the invention verifies that the source IP address of an IP packet received from the session has to be anonymized, it determines that all IP packets from the same session are also concerned by the anonymization request.

The anonymization device in accordance with the invention can apply specific processing to these IP packets of the same session, in particular an anonymization or routing identical to the first IP packet received from this session.

This embodiment allows to save processing time at the anonymization device. Indeed, the anonymization device does not need to query the database or to find the marking information item if the received IP packet is from the same session as the previous IP packet for which it has been determined that its source IP address had to be anonymized.

In particular, when the verification for the first IP packet received from the IP session is based on the detection of the marking information item, the device having inserted this marking information item can be satisfied with marking a single or certain IP packets of that IP session, and not all of the IP packets in the same session.

In one embodiment, during the verification step, it is determined that the source IP address of the IP packet has to be anonymized if it has been previously determined that the source IP address of a previous IP packet transmitted by said transmitting device to said recipient device should be anonymized.

This embodiment allows to save processing time at the anonymization device by avoiding querying the database or finding the marking information item if the new received IP packet has the same source and recipient IP addresses as the previous packet for which it was determined that its source IP address should be anonymized. It is noted that the anonymization device must in any case obtain the recipient IP address, and possibly the source IP address, for routing the packet.

This embodiment allows to anonymize all the IP traffic transmitted by the transmitting device to the recipient device, without verifying IP session parameters.

This embodiment is also more advantageous than the solutions of the prior art based on the use of a proxy server or a VPN server. Indeed, the invention does not require configuration of the IP address and the port number of the anonymization device at the transmitting device or the network terminal apparatus.

In one embodiment, the anonymization request processing method in accordance with the invention further includes a step of incrementing an IP packet counter including the marking information item.

The invention allows to perform statistics on the number or percentage of IP packets whose source IP addresses have to be anonymized. These statistics can be used to size the network, for example in terms of the number and positioning of anonymization devices in accordance with the invention, to anticipate changes in a network, to offer new functions for connection to a network, to adapt the quality of service offered by a network, and/or to establish billing policies.

In one embodiment, the anonymization request processing method in accordance with the invention further includes a step of deleting the marking information item before a transfer of this IP packet to another device.

This mode is suitable for local processing of IP packets, at the anonymization device in accordance with the invention, without disclosing the marking information items to the other devices through which the IP packet passes until it reaches its recipient device. In this way, the recipient device will not know that the source IP address has been anonymized.

However, the marking information item can be transmitted to the recipient device for security reasons, in particular when the recipient device is a service server. The recipient device can thus know that the source IP address of an IP packet received with a marking information item has been anonymized and then decides whether or not to respond to this IP packet.

In one embodiment, the anonymization request processing method in accordance with the invention further includes a step of modifying the marking information item before a transfer of this IP packet to another device.

This embodiment can be implemented to ensure compatibility when passing the IP packet from one network to another, these two networks not using the same format of marking information items.

In one embodiment, the step of routing the IP packet by the anonymization device in accordance with the invention includes a selection of a quality of service to be applied to the IP packet, as a function of the result of the verification step, that is to say according to the presence or not of the anonymization request.

For example, the anonymization device in accordance with invention can process the IP packets whose IP addresses are anonymized or to be anonymized in a less privileged manner compared to the other IP packets, by arranging them in lower priority or longer queues, or by transporting them on a communication channel with poorer performance (in terms of latency or signal-to-noise ratio for example), or by routing them to slower routes, etc.

In one embodiment, the anonymization request processing method in accordance with the invention further includes a step of marking the IP packet, the marking being of the IP DSCP (for "Differentiated Service Code Point") type. This embodiment allows to notify nodes placed downstream of the anonymization device, of a level of priority associated with the IP packet and/or of other processing to be applied to the IP packet.

In one embodiment, the anonymization request processing method in accordance with the invention further includes a step of applying a billing method depending on the result of the verification step, that is to say according to the presence or not of the anonymization request.

In one embodiment, the anonymization request processing method in accordance with the invention further includes a step of sending an ICMP (for "Internet Control and Error Message Protocol") packet to the transmitting device to inform it of a reason for refusing to forward its IP packet to the recipient device.

This embodiment can be implemented when the recipient device blocks the IP packets received from the anonymization device, or the packets for which the recipient device suspects or detects via the marking information item that their source IP addresses have been anonymized.

In one embodiment, the anonymization request processing method in accordance with the invention further includes a step of creating an IP tunnel for the step of routing the IP packet.

This embodiment allows to direct the IP packet to a specific destination, namely the other end of the IP tunnel, and to apply to the packet a determined quality of service method corresponding to this IP tunnel, or else for example to apply a particular processing such as for example an encryption of the IP traffic passing through this tunnel.

This embodiment can be implemented in a privileged manner when the anonymization device does not have an address translation function. In this embodiment, the IP packet is routed through the IP tunnel to the network apparatus which has an address translation function.

In one embodiment, the anonymization request processing method in accordance with the invention further includes a step of de-encapsulating an IP tunnel so as not to route the IP packet via this IP tunnel.

This embodiment allows to apply to the IP packet a routing method and a method for applying a quality of service, other than the methods implemented for the IP tunnel.

In one embodiment, the anonymization request processing method in accordance with the invention further includes a step of storing parameters of the session during which the IP packet is received, in order to apply a processing to other IP packets from the same session.

In particular, the storage of session parameters allows to identify at least one IP packet responding to the IP packet received by the anonymization device in accordance with the invention. This embodiment allows specific processing to be applied to response IP packets to IP packets received from the transmitting device, such as applying a particular routing method.

Also, the storage of session parameters allows to identify other IP packets received from the transmitting device, from the same session as the IP packet for which it has been determined that the source IP address has to be anonymized. Thus, once the IP session is established, when the anonymization device in accordance with the invention detects an anonymization request for a first IP packet of the session, it can deduce that the IP packets of the same session are also concerned by the anonymization request.

In one embodiment, the anonymization request processing method in accordance with the invention further includes a step of storing a parameter of an application layer header encapsulated in the received IP packet, in order to apply processing of other packets including the same parameter.

In particular, the parameter may relate to an identifier of the transmitting device, to an identifier of a manufacturer of the transmitting device, to an identifier of an operator with which the transmitting device is subscribed, to an identifier of the recipient device or of its operator, to an identifier of a web browser ("User Agent" parameter for example), to an identifier of a website ("Referer" parameter for example), or to an identifier relating to activities on the websites previously consulted ("cookies" parameter for example).

In one embodiment, the request for anonymization of a source IP address of an IP packet further includes a request for anonymization of a source port number of this IP packet, the anonymization of the source port number including a modification of the number.

The anonymization of the source port number allows to improve the security of the IP traffic transmitted by the terminal.

The source port number can be replaced by a port number of the anonymization device, or by another number, or by a determined value which means that the source port number is masked.

In one embodiment, the request for anonymization of a source IP address of an IP packet further includes a request for anonymization of a parameter of an application layer header encapsulated in the IP packet, the anonymization of this parameter including its modification or deletion.

In this embodiment, the method for processing an anonymization request further includes:
  if the anonymization device has an application layer header processing function, such as a DPI (for "Deep Packet Inspection") type function, a step of anonymizing the parameter of the application layer header; and
  otherwise, a step of routing the IP packet to the recipient device via an apparatus of the network which has an application layer header processing function.

The parameter of the application header can be related to the web browser ("User Agent" parameter) or to the website ("Referer" parameter) from which a new web request is activated and having generated the IP packet, or to information items about previously visited websites ("cookie" parameters). The recipient device will therefore not be able to know these information items.

In one embodiment, the anonymization device in accordance with the invention includes an application layer header processing module configured to anonymize the parameter of an application layer header encapsulated in the packet, this module implements a DPI type function for example.

In one embodiment, the request for anonymization of a source IP address of an IP packet includes an anonymization request for:
  any IP traffic transmitted by the transmitting device;
  any IP traffic transmitted by the transmitting device during the same session as said IP packet;
  a traffic generated by an application of the transmitting device;
  any traffic transmitted by all devices connected to the network via the network terminal apparatus.

The invention thus offers several options for anonymization. Unlike the solutions of the prior art, the invention allows to select the IP traffic for which the source IP addresses of its IP packets have to be anonymized.

The anonymization device in accordance with the invention can be comprised in:
  a BAS (for "Broadband Access Server"), Node Edge, MSAP (for "Multi Service Access Platform") or PFA (for "Access Platform") type server;
  a router;
  PGW (for "Packet data network Gate Way") type apparatus;
  a proxy server;
  a recipient gateway type network terminal apparatus;
  a recipient server; or
  a recipient terminal.

Several network devices currently available on the market can be modified to carry out the anonymization request processing method according to the invention.

The anonymization device in accordance with the invention has at least one IP routing function of the layer 3 of the OSI model.

The invention also relates to an anonymization system, configured to process a request for anonymization of a source IP address of an IP packet transmitted by a transmitting device to a recipient device via a communications network, the transmitting device being connected to the network via a network terminal apparatus, the anonymization system being positioned for cutting the flow between the network terminal apparatus and the recipient device, and comprising:
- an anonymization device in accordance with the invention, not having an address translation function; and
- a network apparatus with an address translation function.

Thus, when the anonymization device in accordance with the invention cannot anonymize the IP address of an IP packet, it routes this IP packet to the network apparatus to perform the anonymization. The network apparatus can be a proxy server or any other apparatus that has an address translation function.

The anonymization system according to the invention is more advantageous than a proxy server of the prior art. Indeed, the anonymization system according to the invention can be used to process IP traffic generated by a mobile application partially or globally integrating the WebView mode and more generally from any application and for any application protocol encapsulated in IP packets. In addition, the invention does not require configuration of the parameters of a proxy server at the transmitting device and/or at the applications installed on the transmitting device.

In one embodiment, the anonymization system in accordance with the invention includes:
- an anonymization device in accordance with the invention, having neither an address translation function, nor an application layer header processing function;
- a network apparatus having an address translation function; and
- a network apparatus having an application layer header processing function, such as a DPI function.

The invention also relates to a method for requesting anonymization of a source IP address of an IP packet transmitted by a transmitting device to a recipient device via a communications network, the transmitting device being connected to the network via a network terminal apparatus, this method being carried out by the network terminal apparatus and comprising:
- a step of detecting a configuration to request anonymization;
- upon said detection, a step of inserting a marking information item in a field of the IP packet, the marking information item being representative of the request for anonymization of the source IP address and interpretable by a device, called anonymization device, which is positioned for cutting the flow between the network terminal apparatus and the recipient device; and
- a step of sending the IP packet to the recipient device.

Correlatively, the invention relates to a network terminal apparatus configured to request anonymization of a source IP address of an IP packet sent by a transmitting device to a recipient device via a communications network, the transmitting device being connected to the network through the network terminal apparatus, the network terminal apparatus comprising:
- a detection module configured to detect a configuration to request anonymization of the source IP address; and
- a request module configured to insert, upon said detection, a marking information item in a field of the IP packet, the marking information item being representative of the anonymization request that can be interpreted by a device, called anonymization device, which is positioned for cutting the flow between the network terminal apparatus and the recipient device; and
- a communication module configured to send the IP packet to the recipient device.

The features and advantages of the anonymization request method according to the invention presented below apply equally to the network terminal apparatus according to the invention and vice versa.

The features and advantages of the anonymization request method according to the invention presented here apply equally to the method for processing an anonymization request according to the invention and vice versa.

The network terminal apparatus in accordance with the invention can implement the anonymization request method in accordance with the invention.

In one embodiment, the marking information item is different from the source IP address or a recipient IP address of the packet.

In one embodiment, the marking information item represents only the anonymization request and has no other meanings.

In one embodiment, the step of detecting a configuration includes detecting a use of a specific protocol on the transmitting device to transmit the IP packet.

For example, the specific protocol for the present invention can be named "httpa". This protocol is an instance of the http protocol of the prior art, and it also allows to specify that a request including the prefix of the httpa protocol is a request for which it is requested to anonymize the source IP address of the IP packets corresponding to this request. The letter "a" of the "httpa" protocol denotes anonymization. The httpa protocol is an application layer protocol.

The same mechanism can be applied for all application protocols such as FTP (for "File Transfer Protocol"), DNS (for "Domain Name System"), NTP (for "Network Time Protocol"), SIP (for "Session Initiation Protocol"), RTP (for "Real-time Transport Protocol"), RTCP (for "Real-time Transport Control Protocol"), SMTP (for "Simple Mail Transfer Protocol"), etc. Adding an "a" suffix to instances of these protocols represents requests for anonymization.

In This embodiment relating to the use of a specific protocol, the lower layer protocol stack in the OSI model detects the use of the specific protocol (httpa for example) and interprets this use as an anonymization request. The lower layer protocol stack can be, by way of example, the TCP/IP (for "Transmission Control Protocol/Internet Protocol") protocol stack or the UDP/IP (for "User Datagram Protocol/IP") protocol stack or the SCTP/IP (for "Stream Control Transmission Protocol/IP") protocol stack or an intermediate software layer between an application or a browser installed on the transmitting device and the TCP/IP or UDP/IP or SCTP/IP protocol stack. In particular, the use of the specific protocol can be detected by the access API (API for "Application Programming Interface") programming interface of the TCP/IP or UDP/IP or SCTP/IP protocol stack.

The specific protocol can be used on a web browser or on an application installed on the transmitting device, for example a mobile application partially or globally using the WebView mode.

This embodiment allows a user of the transmitting device to configure and control the implementation of the anonymization request method in accordance with the invention, request by request.

In one embodiment, the step of detecting a configuration includes detecting a configuration information item in a configuration menu of the network terminal apparatus.

This embodiment allows to use the configuration menu already installed on the network terminal apparatus to implement the anonymization request method in accordance with the invention.

This embodiment allows to configure the network terminal apparatus to request anonymization permanently, and not request by request.

In particular, when the network terminal apparatus is the transmitting device, the configuration information item can be specified by the user of the transmitting device.

When the network terminal apparatus is a gateway, such as a Livebox type apparatus for example, the configuration information item can be specified by a user of this gateway via a configuration interface of the gateway, or by a user of the transmitting device via an application installed on the transmitting device and which allows access to the gateway configuration menu.

A software module is added to the configuration menu of the terminal apparatus to give a user of this apparatus the possibility of selecting an embodiment of the anonymization request method in accordance with the invention: for example request to anonymize the IP address for all the packets generated by the transmitting device, or for all the packets to be transmitted by the network terminal apparatus, or only for packets generated by a specific application.

Alternatively, the configuration information item can be specified by the operator managing the network, based on membership in an IUIR type service, for example via an apparatus for managing network devices, which provides the configuration to the network terminal apparatus.

In one embodiment, the step of detecting a configuration includes detecting a configuration information item in an application installed on the transmitting device.

This embodiment allows the transmitting device to be configured to request anonymization permanently. This embodiment also allows a user of the transmitting device to select an embodiment of the anonymization request method in accordance with the invention. In this embodiment, the transmitting device constitutes a network terminal apparatus in accordance with the invention.

The fact of separating the application specific to the present invention from the configuration menu of the transmitting device allows to improve the software security and allows to adapt to existing devices which do not have configuration parameters for the anonymization of the IP traffic. In accordance with this embodiment, the application can be downloaded from an Internet network. The application can be generic and does not depend on a particular configuration menu of a transmitting device.

It is noted that when the transmitting device is configured with parameters of a proxy server, the TCP/IP or UDP/IP or SCTP/IP protocol stack of the network terminal apparatus or the access API of this protocol stack or an intermediate software layer between the application that generated the IP packet and the TCP/IP or UDP/IP or SCTP/IP stack of the network terminal apparatus can detect this configuration by detecting a difference between the recipient IP address of the IP packet (which is the IP address of the proxy server) and the Host address contained in the application layer headers (which is the IP address of the recipient device). In this case, the network terminal apparatus can replace the recipient IP address of the IP packet with the address of the recipient device and implement the anonymization request method in accordance with the invention.

In the case where the IP packet is of the IPv4 type, the network terminal apparatus can insert the marking information item in the "Type of service" field or the "Flags" field or the "IP options" field of the IPv4 header of the IP packet.

It is recalled that the "Type of service" field includes eight bits including two ECN (for "Explicit Congestion Notification") bits. These two bits were defined in 2001 by the standardization but at the current state of the art, these bits are not used. They can be used in accordance with the present invention to insert the marking information item therein. The size of the IP packet is not increased.

It is recalled that the "Flags" field is coded on three bits and in the state of the art only uses the second bit (called "don't fragment") and the third bit (called "more fragments"). Therefore, the first bit of this "Flags" field can be used by the present invention. For example, this first bit can be set to 1 for IP packets with an anonymization request and set to 0 for other packets. The size of the IP packet is not increased.

It is recalled that an IPV4 option is coded on 8 bits. It is possible to create a new IP option, from one of classes 0 to 3, to insert the marking information item therein. Using the "IP Options" field consumes more memory than using the "Type of Service" or "Flags" field. Indeed, the use of the "IP Options" field increases the size of the IP packet to a maximum of 4 bytes, even if an IP option is coded on a single byte so as to preserve the alignment of the IP packets on a multiple of 32 bits.

The use of the "Type of service" field or of the "Flags" field is therefore preferable in terms of the size of the IP packet and the search for a marking information item in the packet.

In the case where the packet is of the IPv6 type, the transmitting device can insert the marking information item in the "Traffic class" field, in particular the ECN bits of this "Traffic class" field, or the "Flow label" field or the "extension header" field of the IPv6 header of the IP packet.

A determined flow label value can indicate an anonymization request, for example by choosing a hexadecimal value of the type "0xBCDEF".

Alternatively, the marking information item can be inserted into a new "anonymization" option value encoded in TLV (for "Type Length Value") and encapsulated in the existing "Hop by Hop Options" extension.

Alternatively, a new IPv6 extension can be created specifically to insert therein the marking information item, this new extension can be named "Anonymous traffic" and including for example a value of 61.

Thus, the invention is compatible with the IPv4 and IPv6 protocols, and can therefore be easily implemented by transmitting devices and network apparatuses (anonymization apparatuses within the meaning of the invention) currently available on the market with minor modifications to insert and search for marking information items.

The invention can be used to mark traffic of different applications, such as web browsing applications, mail applications, file transfer applications FTP (for "File Transport Protocol"), TV applications, video applications VoD (for "Video on Demand"), Voice over IP VoIP applications, signaling traffic generated by connected and/or autonomous vehicles, etc. Indeed, the marking information items are inserted at IP headers and do not impact the data of these applications integrated into the bodies of IP packets.

In one embodiment, the marking information item is inserted into the "source port number" field at the transport layer 4 of the OSI model (governed by the TCP or UDP or SCTP protocol for example). A new source port number value is created specifically for the invention, this value denotes a request to anonymize the source IP address.

The invention is compatible with the MPTCP (for "Multi Path Transport Control Protocol") traffic aggregation protocol.

The invention may be compatible with combinatorial tunnel mechanisms, allowing to switch from one protocol among the IPv4, IPv6 and GTP (for "GPRS Tunneling Protocol") protocols to another.

The invention is also compatible with the security mechanisms of the prior art, such as the protocols IPSec (for "Internet Protocol Security"), sRTP (for "Secured Real Time Protocol"), SIPS (for "Session Initiation Protocol Secured"), HTTPS (for "Hyper Text Transfer Protocol Secured"), and TLS (for "Transport Layer Security").

The invention also relates to a communication system allowing to anonymize a source IP address of an IP packet.

This system includes an anonymization device or an anonymization system in accordance with the invention, and a network terminal apparatus in accordance with the invention.

The invention also relates to a first computer program on a recording medium, this program being capable of being implemented in a computer or anonymization apparatus in accordance with the invention. This program includes instructions adapted to the implementation of an anonymization request processing method as described above.

The invention also relates to a second computer program on a recording medium, this program being capable of being implemented in a computer or network terminal apparatus in accordance with the invention. This program includes instructions adapted to the implementation of an anonymization request method as described above.

The invention also relates to a third computer program on a recording medium, this program being capable of being implemented in a computer or a transmitting device or a network terminal apparatus in accordance with the invention. This program includes instructions adapted to allow a user to configure the transmitting device and/or the network terminal apparatus to select a particular embodiment of an anonymization request method as described above. This third computer program can be an application installed on the transmitting device or a software module comprised in the configuration menu of this transmitting device, or a software module comprised in the configuration menu of the network terminal apparatus.

Each of these programs can use any programming language, and be in the form of source code, object code, or intermediate code between source code and object code, such as in a partially compiled form, or in any other desirable form.

The invention also relates to a computer readable information medium or recording medium, and including instructions of the first or of the second or of the third computer program as mentioned above.

The information or recording media can be any entity or device capable of storing programs. For example, the media can include a storage means, such as a ROM, for example a CD ROM or a microelectronic circuit ROM, or else a magnetic recording means, for example a floppy disc or a hard disc, or flash memory.

On the other hand, the information or recording media can be transmissible media such as an electrical or optical signal, which can be routed via an electrical or optical cable, by radio link, by wireless optical link or by other means.

The programs according to the invention can in particular be downloaded from an Internet type network.

Alternatively, each information or recording medium can be an integrated circuit into which a program is incorporated, the circuit being adapted to execute or to be used in the execution of a method in accordance with the invention.

BRIEF DESCRIPTION OF THE DRAWINGS

Other features and advantages of the present invention will emerge from the description given below, with reference to the appended drawings which illustrate an exemplary embodiment thereof without any limiting nature. In the figures:

FIG. 1 illustrates an architecture of a network in which methods of the invention can be implemented according to a first embodiment of the invention;

FIG. 2 is a flowchart representing steps of a method for requesting anonymization and steps of a method for processing an anonymization request, the methods being in accordance with the invention and implemented according to the first embodiment;

FIG. 3 illustrates an architecture of a network in which methods of the invention can be implemented according to a second embodiment of the invention;

FIG. 4 is a flowchart representing steps of a method for requesting anonymization and steps of a method for processing an anonymization request, the methods being in accordance with the invention and implemented according to the second embodiment;

FIG. 5 illustrates an architecture of a network in which methods of the invention can be implemented according to a third embodiment of the invention;

FIG. 6 illustrates an architecture of a network in which a method for processing an anonymization request in accordance with the invention can be implemented according to a fourth embodiment of the invention;

FIGS. 7A and 7B show functional architectures, according to two embodiments of the invention, of a network terminal apparatus in accordance with the invention described with reference to FIGS. 1 to 4;

FIGS. 8A and 8B illustrate functional architectures of anonymization devices in accordance with the invention, described with reference to FIGS. 1 to 4;

FIG. 9 shows a hardware architecture of a network terminal apparatus according to an embodiment of the invention; and FIG. 10 shows a hardware architecture of an anonymization device according to one embodiment of the invention.

DESCRIPTION OF EMBODIMENTS

FIG. 1 illustrates an architecture of a network NET in which the methods in accordance with the invention, for requesting anonymization of a source IP address, and for processing the request can be implemented according to a first embodiment of the invention.

The network NET allows to connect a terminal T to a server SRV. The network NET can include several sub-networks, managed by one or more operators.

The terminal T constitutes a transmitting device within the meaning of the invention, and also a network terminal apparatus in accordance with the invention. The server SRV constitutes a recipient device within the meaning of the invention.

A network apparatus EqA in accordance with the invention is positioned in the network NET, for cutting the flow between the terminal T and the server SRV. The IP traffic exchanged between the terminal T and the server SRV passes through this apparatus EqA. The apparatus EqA constitutes an anonymization device in accordance with the invention.

In the embodiment described here, the anonymization device EqA is a router which has an address translation function NAPT.

There are no constraints on the location of the device EqA in the network NET, except that it is positioned for cutting the flow between the terminal T and the server SRV. The device EqA can belong to the same sub-network as the terminal T, or to the same sub-network as the server SRV.

FIG. 2 is a flowchart representing steps of a method for requesting anonymization of a source IP address, in accordance with the invention, implemented by the terminal T described with reference to FIG. 1. The flowchart of FIG. 2 also represents steps of a method for processing a request for anonymization of a source IP address, in accordance with the invention, implemented by the anonymization device EqA described with reference to FIG. 1.

Steps E100, E102, E104 and E106 described below are steps of the anonymization request method in accordance with the invention.

Steps E108, E110, E112, E114 and E116 described below are steps of the method for processing an anonymization request in accordance with the invention.

During a step E100, the terminal T detects a configuration which represents a request by the user of the terminal T to anonymize the source IP address of the packets generated by its terminal T.

In the embodiment described here, this configuration is initiated by the user of the terminal T on an application APP installed on the terminal T, the application APP being dedicated to allow the user to choose whether or not to implement the request method in accordance with the invention.

Alternatively, the configuration can be initiated by the user of the terminal T on a software module of the configuration menu of the terminal T, this software module allowing the user to choose whether or not to implement the request method in accordance with the invention.

In the embodiment described here, the application APP allows the user to select a choice from: requesting anonymization for all IP traffic (all IP packets) generated by the terminal T, or requesting anonymization of IP traffic generated by a particular application installed on the terminal T.

During a step E102, the terminal T detects, for example via its web browser or via an application installed on this terminal, after a user activity, a generation of data D_App intended to be sent to the server SRV. The terminal T generates IP packets, including an IP packet P, to transport this data D_App to the server SRV via the network NET.

During a step E104, and after the detection E100 of the configuration, the terminal T inserts in a field of the IP header of the IP packet P a marking information item iMRK. This marking information item iMRK represents a request by the terminal T for the source IP address of the IP packet P to be anonymized in the network NET before reaching the server SRV.

The meaning of the marking information item iMRK may depend on the configuration detected during step E100. For example, if the configuration of the application APP means that the user of the terminal T wishes to anonymize all the IP traffic generated by the terminal T, the marking information item iMRK represents a request for anonymization of all the IP packets having as source IP address the IP address of the terminal T.

Alternatively, the marking information item iMRK may represent a request to anonymize the source IP address for the packet P only.

Alternatively, the marking information item iMRK can represent a request for anonymization of the source IP address for all IP packets of the same IP session as the packet P.

The marking information item iMRK inserted into a field of the header of the packet P can signify a request for anonymization of the source IP address of the packet P, but also a request for anonymization of the source port number of the packet P, and/or a request for anonymization of one or more parameters of an application layer header encapsulated in the packet P.

A convention is established beforehand in the network NET for a coherent interpretation of the marking information item iMRK, between the terminal T and the anonymization device EqA in accordance with the invention.

The marking information item iMRK can be inserted into:
- the "Type of service" field or the "Flags" field or the "IP options" field of the IPv4 header of the packet P, if this packet P is of IPv4 type; or
- the "Traffic class" or "flow label" or "extension header" type field of the IPv6 header of the packet P, if this packet P is of the IPv6 type; or
- the "source port number" field of a header encapsulated in the packet P; in this case, the marking information item iMRK is a determined source port number, specific to the invention, and which represents the request of the terminal T to anonymize at least its IP address.

During a step E106, the terminal T sends the packet P via the network NET to the server SRV. The packet P includes in its header the marking information item iMRK, the IP address of the terminal T, @T, as the source IP address, and the IP address of the server SRV, @SRV, as the recipient IP address. In its data field, the packet P includes the data D_App detected during step E102.

During a step E108, the anonymization device EqA which is positioned for cutting the flow between the terminal T and the server SRV receives the packet P.

During a step E110, the device EqA verifies whether the packet P includes a marking information item, and it detects the marking information item iMRK in the header of the IP packet P. After this detection, the anonymization device EqA determines that the source IP address of the packet should be anonymized.

During an optional step E112, the device EqA deletes this marking information item iMRK so that it is not transmitted to devices of the network NET downstream of the device EqA.

During a step E114, the device EqA implements its address translation function, of NAT or NAPT type: it modifies the source IP address of the packet P by replacing the address @T of the terminal T by its IP address, @EqA. The device EqA stores an identifier of the packet P and the address @T of the terminal T in its memory, in order to be able to identify a packet of response to the packet P and route this response IP packet to the terminal T.

According to the marking information item iMRK, the device EqA can also modify, during step E114, the source port number of the packet P by its own, or by another port number.

The device EqA can also, during step E114, depending on the marking information item iMRK and the capacities of the device EqA to implement a DPI function, modify or delete a parameter from an application layer header encapsulated in the packet P.

During a step E116, the device EqA sends the modified IP packet P to the server SRV, the packet P having as its source IP address the address @EqA of the device EqA.

During a step E118, the server SRV receives the modified IP packet P.

The server SRV responds to the received packet P with an IP response packet Q. For the server SRV, the packet P comes from the device EqA; then the recipient IP address of the packet Q is that of the device EqA.

During a step E122, the device EqA receives the response IP packet Q.

During a step E124, the device EqA consults its NAT or NAPT table, replaces the recipient IP address of the packet Q with the address @T of the terminal T and transmits the packet Q to the terminal T.

The terminal T receives the response IP packet Q during a step E126.

FIG. 3 illustrates an architecture of a network NET in which the methods in accordance with the invention, for requesting anonymization of a source IP address, and for processing the request can be implemented according to a second embodiment of the invention.

In this second embodiment, the network NET includes the terminal T and the server SRV described with reference to FIGS. 1 and 2, an anonymization device EqA' in accordance with the invention and a proxy server PRX.

The anonymization device EqA' and the proxy server PRX form an anonymization system SA in accordance with the invention.

In the embodiment described here, the anonymization device EqA' does not have an address translation function, nor a DPI function allowing to manage the application layer headers encapsulated in the packet P.

There are no constraints on the location of the anonymization system SA in the network NET, except that it is positioned for cutting the flow between the terminal T and the server SRV. The system SA can belong to the same sub-network as the terminal T, or to the same sub-network as the server SRV. In particular, the device EqA' and the server PRX can belong to two different sub-networks.

The proxy server PRX has an address translation function and a DPI function.

FIG. 4 is a flowchart showing steps of the methods in accordance with the invention, implemented according to the second embodiment.

Steps E100, E102, E104 and E106 described below are steps of the anonymization request method in accordance with the invention and are implemented by the terminal T.

Steps E108, E110, E112 and E113a described below are steps of the method for processing an anonymization request in accordance with the invention and are implemented by the anonymization device EqA'.

The terminal T implements steps E100 to E106, identical to steps E100 to E106 described with reference to FIG. 2.

The device EqA' implements steps E108 to E112 identical to steps E108 to E112 described with reference to FIG. 2.

In this embodiment, the device EqA' does not have an address translation function and cannot anonymize the source IP address of the packet P. During a step E113a, the device EqA' transfers the packet P to the proxy server PRX. At this point, the packet P has as its source IP address, the address @T of the terminal T and the address @SRV of the server SRV as its recipient address.

In this embodiment, the device EqA' does not have a function for processing application layer headers, such as a DPI function. The device EqA' cannot anonymize the parameters of the application layer headers encapsulated in the packet P. It is also for this reason that the device EqA' routes the packet P during step E113a to the proxy server PRX, having a DPI function.

During a step E113b, the proxy server PRX receives the packet P.

The proxy PRX server implements its address translation function in accordance with the prior art: it modifies the source IP address of the packet P by its IP address, @PRX. With a DPI function, the proxy server PRX can also modify or delete parameters from the application layer headers encapsulated in the packet P.

During an optional step E115, the proxy server PRX deletes the marking information item iMRK if it has not already been done (E112) by the device EqA'.

During a step E116 similar to step E116 described with reference to FIG. 2, the proxy server PRX sends the packet P to its destination, the server SRV.

During two steps E118 and E120, similar to steps E118 and E120 described with reference to FIG. 2, the server SRV receives the packet P and responds thereto with a packet Q. The packet Q includes in its header the address @PRX as the recipient address.

During a step E122, the proxy server PRX receives the packet Q, consults its address translation table, and modifies the recipient IP address of the packet Q by the address @T of the terminal T.

During a step E124, the proxy server PRX sends the packet Q to the terminal T via the device EqA'.

During a step E125, the device EqA' receives the packet Q and routes it to the terminal T.

During a step E126 similar to step E126 described with reference to FIG. 2, the terminal T receives the response IP packet Q.

In one embodiment, the proxy server PRX has an address translation function, but no DPI function, the marking information item iMRK detected (E110) by the anonymization device EqA' represents a request to anonymize the source IP address of the packet P and of a parameter of an application layer header. In this embodiment, the device EqA' transfers (E113a) the packet P to the proxy server PRX to anonymize the source IP address, while specifying to the proxy server PRX that it must route the packet P to another apparatus on the network to anonymize the parameter of the application header, before being forwarded to the recipient device SRV, this other apparatus of the network having a DPI function.

In one embodiment, the proxy server PRX has a DPI function, but no address translation function, the marking information item iMRK detected (E110) by the anonymization device EqA' represents a request to anonymize the source IP address of the packet P and of a parameter of an application layer header. In this embodiment, the device EqA' transfers (E113a) the packet P to the proxy server PRX to anonymize the parameter of the application header, while specifying to the proxy server PRX that it must route the packet P to another apparatus on the network to anonymize the source IP address, before being routed to the recipient device SRV, this other apparatus of the network having an address translation function.

FIG. 5 illustrates an architecture of a network NET in which the methods according to the invention, for requesting anonymization of a source IP address, and for processing the request can be implemented according to a third embodiment of the invention.

In this embodiment, the network NET includes a network terminal apparatus BX in accordance with the invention, the device EqA described with reference to FIGS. 1 and 2, and the server SRV. A terminal T' of the prior art is connected to the network NET via the network terminal device BX.

The network terminal apparatus BX, in accordance with the invention, is a gateway between the network NET and a local network including the terminal T'. In this description, the terms "network terminal apparatus BX" and "gateway BX" are used equivalently. This gateway BX has an address translation function.

The terminal T' constitutes a transmitting device within the meaning of the invention. The server SRV constitutes a recipient device within the meaning of the invention.

The gateway BX is configured to implement the anonymization request method in accordance with the invention.

The gateway BX detects (E100) a configuration to request to anonymize its IP address of its WAN (for Wide Area Network) interface for the packets that it receives from the terminals of its local network (including the terminal T') and that it transfers to the network NET.

The configuration may have been carried out by an operator of the network NET. Alternatively, the configuration may have been carried out by a user of the gateway BX or of the terminal T' connected to the gateway BX, for example via a configuration platform of the gateway BX.

After the detection (E100) of the configuration, the gateway BX inserts (E104) the marking information item iMRK in the headers of the IP packets that it sends to the network NET.

In another embodiment, the gateway BX is configured to implement the anonymization request method for certain terminals of the local network, for example for the terminal T' only, and not all the terminals which are connected thereto. The gateway BX only inserts the marking information item iMRK into the IP packets that it receives from this terminal T', before transmitting them to the network NET.

In another embodiment, the gateway BX is configured to implement the anonymization request method for the IP packets that it generates itself.

The anonymization device EqA shown in FIG. 5 implements the anonymization request processing method, the device EqA and the method being in accordance with the invention.

FIG. 6 illustrates an architecture of a network NET in which the request processing method can be implemented according to a fourth embodiment of the invention.

The network NET allows to connect a terminal T' of the prior art to the server SRV. An anonymization apparatus EqA in accordance with the invention is placed in the network NET, for cutting the flow between the terminal T' and the server SRV.

In the embodiment described here, the terminal T' does not implement an anonymization request method in accordance with the invention. The network NET is a cellular network, for example of the 4G type (4th generation).

In the embodiment described here, the anonymization device EqA is a router of the PGW type which has a PCEF (for "Policy and Charging Enforcement Function").

When the device EqA receives a packet P from the terminal T', it queries its internal database DB-EqA, for example by providing the address @T' of the terminal T' to retrieve information items on the subscription of the user of the terminal T'. The database DB-EqA is updated when creating the access point name, APN Internet, used by the application of the terminal T' which generated the IP packet P. This update includes a copy of technical information items obtained from an SPR type database connected to a PCRF type device, itself connected to the PCEF function of the PGW router (constituting the anonymization device EqA).

In this example, assumption is made that the user of the terminal T' has subscribed to a source IP address anonymization service for the IP traffic generated by his terminal T'. By querying its database DB-EqA, the device EqA determines that the IP address of the terminal T' should be anonymized.

The device EqA then implements the following steps of the request processing method in accordance with the invention:

If the device EqA has an address translation function, this apparatus EqA anonymizes the source IP address of the packets received from the terminal T' then routes them to the server SRV; and If the device EqA does not have an address translation function, this apparatus EqA routes the packets received from the terminal T' to the server SRV via a network apparatus which has an address translation function.

In this example, the anonymization device EqA is a PGW type router which has an address translation function, it then itself anonymizes the source IP address of the terminal T'.

The SPR database can further include information items that the device EqA interprets as requests to further anonymize the source IP port number of the IP packets transmitted by the terminal T', and/or to anonymize one or more parameters of an application layer encapsulated in IP packets transmitted by the terminal T'. As a reminder, existing PGW routers already have a DPI function.

In the embodiments already described, the recipient device of the packets is the server SRV. Alternatively, this recipient device can be a terminal, or a system including a gateway type network terminal apparatus and a terminal.

If the marking information item iMRK is deleted (E112, E115) from the header of the packet P, before its arrival at the recipient device SRV, this recipient device SRV will not know that the source IP address of the packet P has been anonymized.

In another embodiment of the invention, the marking information item iMRK is not deleted until the packet P is received by the recipient device SRV. When an IP address is anonymized, it is masked for an application installed on the recipient device SRV and/or for the user of the recipient device. In this embodiment, the recipient device SRV can implement the request processing method in accordance with the invention, when it detects a marking information item iMRK in a header of a packet that it receives, it does not provide an information item on the presence of the marking information item iMRK or the source IP address of the IP packet to the application and/or to the user of this recipient device SRV.

FIGS. 7A and 7B show functional architectures, according to two embodiments of the invention, of the terminal T in accordance with the invention and described with reference to FIGS. 1 to 4.

The terminal T is a network terminal apparatus of the invention. The terminal T is configured to request anonymization of a source IP address of an IP packet that it sends via the communications network NET to the server SRV.

The terminal T comprises:
  a detection module DTC configured to detect a configuration to request anonymization; and
  a request module INS configured to insert, upon said detection, the marking information item iMRK in a field of the IP packet, this marking information item iMRK being representative of the anonymization request that can be interpreted by an anonymization device in accordance with the invention (such as the devices EqA and EqA' described in FIGS. 1 and 3) and which is positioned for cutting the flow between the terminal T and the server SRV; and a communication module COM configured to send the IP packet to the server SRV.

In the embodiment illustrated by FIG. 7A, the detection module DTC detects the configuration from a configuration application APP. This configuration concerns all IP traffic sent by the terminal or by a particular application installed on the terminal T.

The gateway BX described with reference to FIG. 5 has a functional architecture similar to the architecture of the terminal T illustrated by FIG. 7A.

In the embodiment illustrated by FIG. 7B, the detection module DTC is comprised in the TCP/IP stack of the terminal T. When the user of the terminal T uses a particular protocol, in a request Rq to access a website via a web browser NAV of the terminal T, the TCP/IP stack and more specifically the detection module DTC detects the use of this particular protocol. The use of this particular protocol is interpreted as a configuration for implementing the anonymization request method in accordance with the invention.

In one embodiment, the detection module DTC is comprised in the UDP/IP protocol stack of the terminal T, or in its SCTP/IP protocol stack, or in an intermediate software layer between the application that generated the packet P and the TCP/IP or UDP/IP or STCP/IP protocol stack.

In one embodiment, this particular protocol is suffixed with the letter "a". For example, for access to a web server, the user wishing to anonymize his web request enters "httpa" instead of "http". The httpa protocol is similar to the http protocol and has the ending "a" for "anonymous". This protocol is used to configure the terminal T to implement the anonymization request method in accordance with the invention for the request Rq. The same mechanism can be applied for all application protocols such as FTP, DNS, NTP, SIP, RTP, RTCP, SMTP, HTTPS, SIPS, SRTP, etc.

The gateway BX described with reference to FIG. 5 has a functional architecture similar to those presented in FIGS. 7A and 7B.

FIGS. 8A and 8B illustrate functional architectures of anonymization devices in accordance with the invention.

FIG. 8A illustrates the functional architecture of the anonymization device EqA' described with reference to FIGS. 3 and 4.

The anonymization device EqA' is configured to process a request for anonymization of a source IP address of an IP packet P transmitted by a transmitting device, such as the terminals T or T', to a recipient device such as the server SRV via a communications network NET, the transmitting device is connected to the network NET via a network terminal apparatus, such as the terminal T or the gateway BX, the anonymization device EqA' being positioned for cutting the flow between the network terminal apparatus T, BX and the recipient device SRV.

The anonymization device EqA' includes:

a communication module COM configured to receive the IP packet P;

a verification module DTC configured to establish whether the source IP address of the IP packet P has to be anonymized or not; and a routing module RTR configured to route the IP packet to the recipient device SRV, the packet P being routed via a network apparatus having an address translation function if the anonymization device EqA' does not have an address translation function and if and only if a result of said verification is positive.

Recall that the device EqA' does not have an address translation function, following a positive result of the verification, the IP packet P is routed via another device of the network having an addresses translation function, such as the proxy server PRX.

FIG. 8B illustrates the functional architecture of the anonymization device EqA described with reference to FIGS. 1 and 2.

The architecture of the device EqA is similar to that of the device EqA', except that the device EqA has an address translation function.

The anonymization device EqA includes an address translation module AN configured to replace, if and only if the result of the verification is positive, the source IP address (@T, @BX) by an IP address (@EqA) of the anonymization device EqA.

An anonymization apparatus according to the invention can be comprised in:

a BAS, Node Edge, MSAP or PFA type server;
a router;
a PGW type apparatus;
a proxy server;
a recipient gateway type network terminal apparatus;
a recipient server; or
a recipient terminal.

In the embodiments described here, the terminal T (or the gateway BX) has the hardware architecture of a computer, as illustrated in FIG. 9.

The architecture of the terminal T or of the gateway BX comprises in particular a processor 7, a random-access memory 8, a read only memory 9, a non-volatile flash memory 10 in a particular embodiment of the invention, as well as communication means 11. Such means are known per se and are not described in more detail here.

The read-only memory 9 of the terminal T or of the gateway BX according to the invention constitutes a recording medium in accordance with the invention, readable by the processor 7 and on which is recorded here a computer program ProgTx in accordance with the invention.

The memory 10 of the terminal T or of the gateway BX allows to record variables used for the execution of the steps of the anonymization request method according to the invention, such as the IP packet P, the marking information item iMRK. The memory 10 of the terminal T allows to record its address @T. The memory 10 of the gateway BX allows to record its address @BX and the address @T' of the terminal T'.

The computer program ProgTx defines functional and software modules here, configured to request anonymization of the IP address of the terminal T or the gateway BX. These functional modules are based on and/or control the hardware elements 7-11 of the terminal T or the gateway BX mentioned above.

In the embodiment described here, the anonymization device EqA or EqA' has the hardware architecture of a computer, as illustrated in FIG. 10.

The architecture of the anonymization device EqA or EqA' comprises in particular a processor 7, a random-access memory 8, a read only memory 9, a non-volatile flash memory 10 in a particular embodiment of the invention, as well as communication means 11. Such means are known per se and are not described in more detail here.

The read only memory 9 of the anonymization device EqA or EqA' according to the invention constitutes a recording medium in accordance with the invention, readable by the processor 7 and on which is recorded here a computer program ProgRx in accordance with the invention.

The memory 10 of the anonymization device EqA or EqA' allows to record variables used for the execution of the steps of the method for processing an anonymization request according to the invention, such as the packets P and Q, the address @T of the terminal T, the address @T' of the terminal r, the address @SRV of the recipient server SRV and the marking information item iMRK. The memory 10 of the anonymization device EqA' also allows to record the address @PRX of the proxy server PRX.

The computer program ProgRx defines functional and software modules here, configured to process an anonymization request. These functional modules are based on and/or control the hardware elements 7-11 of the anonymization device EqA or EqA' mentioned above.

The invention claimed is:

1. A method for processing a request for anonymization of a source IP address of an IP packet transmitted by a transmitting device to a recipient device via a communications network, said transmitting device being connected to said network via a network terminal apparatus, said method being carried out by an anonymization device, which is positioned for cutting the flow between said network terminal apparatus and said recipient device, said method comprising:
receiving said IP packet;
a verification for establishing whether said source IP address of said packet has to be anonymized or not;
if a result of said verification is negative, of routing said IP packet to said recipient device;
if the result of said verification is positive and if said anonymization device has an address translation function:
replacing said source IP address with an IP address of said anonymization device; and
routing said IP packet to said recipient device;
if the result of said verification is positive and if said anonymization device does not have an address translation function, routing said IP packet to said recipient device via an apparatus of said network having an address translation function.

2. The method of claim 1 wherein said verification includes:
a detection of a marking information item in a field of said IP packet, the marking information item being representative of said anonymization request; or
a query of a database to obtain, from said source IP address of said IP packet, a configuration information item relating to a subscription of said transmitting device to an anonymization service of said source IP address; or
a determination that said source IP address of said IP packet has to be anonymized if it has been determined that the source IP address of a previous IP packet of the same session should be anonymized; or
a determination that said source IP address of said IP packet is has to be anonymized if it has been determined that the source IP address of a previous IP packet transmitted by said transmitting device to said recipient device should be anonymized.

3. The method of claim 1 further including at least one step selected from the group comprising:
incrementing an IP packet counter including said marking information item;
deleting or modifying said marking information item before said routing;
creating an IP tunnel for said routing of said IP packet; and
storing a parameter of an application layer header encapsulated in said IP packet, in order to apply processing of other packets carrying the same parameter.

4. The method of claim 1 wherein said request for anonymization of a source IP address of an IP packet further includes a request for anonymization of a parameter of an application layer header encapsulated in said IP packet, the anonymization of said parameter including a modification or deletion of said parameter, said method further including:
if said anonymization device has an application layer header processing function, anonymizing the parameter of the application layer header; and
if said anonymization device does not have an application layer header processing function, routing said IP packet to said recipient device via an apparatus of said network having an application layer header processing function.

5. A method for requesting anonymization of a source IP address of an IP packet transmitted by a transmitting device to a recipient device via a communications network, said transmitting device being connected to said network via a network terminal apparatus, said method being carried out by said network terminal apparatus and comprising:
detecting a configuration to request anonymization;
upon said detection, inserting a marking information item in a field of said IP packet, said marking information item being representative of said request for anonymization of said source IP address and interpretable by an anonymization device, which is positioned for cutting the flow between said network terminal apparatus and said recipient device; and
sending said IP packet to said recipient device.

6. The method of claim 5 wherein detecting a configuration includes at least one detection of:
a use of a specific protocol on said transmitting device to transmit said IP packet;
a configuration information item in a configuration menu of said network terminal apparatus; or
a configuration information item in an application installed on said transmitting device.

7. The method of claim 5, wherein said marking information item is inserted into:
the "Type of service" field or the "Flags" field or the "IP options" field of an IPv4 header, when said packet is of the IPv4 type; or
the "Traffic class" or "flow label" or "extension header" type field of an IPv6 header, when said packet is of the IPv6 type; or
the "source port number" field of a header encapsulated in said packet, said marking information item being a determined communication port number, representative of said request.

8. The method of claim 1, wherein said request for anonymization of a source IP address of an IP packet further includes:
a request for anonymization of a source port number of said IP packet, the anonymization of said source port number including a modification of said number; and/or
a request for anonymization of a parameter of an application layer header encapsulated in said IP packet, the anonymization of said parameter comprising a modification or deletion of said parameter.

9. The method of claim 1, wherein said request for anonymization of a source IP address of an IP packet includes an anonymization request for:
any IP traffic transmitted by said transmitting device;

any IP traffic transmitted by said transmitting device during the same session as said IP packet;
a traffic generated by an application of said transmitting device; or
any traffic transmitted by all devices connected to said network (NET) via said network terminal apparatus (BX).

10. A non-transitory computer readable medium having stored thereon instructions which, when executed by a processor, cause the processor to implement the method of claim 1.

11. A non-transitory computer readable recording medium having stored thereon instructions which, when executed by a processor, cause the processor to implement the method of claim 5.

12. An anonymization device, configured to process a request for anonymization of a source IP address of an IP packet transmitted by a transmitting device to a recipient device via a communications network, said transmitting device being connected to said network via a network terminal apparatus, said anonymization device being positioned for cutting the flow between said communication network terminal apparatus and said recipient device, said anonymization device comprising:
communication means configured to receive said IP packet;
a verificator configured to establish whether said source IP address of said IP packet has to be anonymized or not; and
a router configured to route said IP packet to said recipient device, said IP packet being routed via an apparatus of said network having an address translation function if said anonymization device does not have an address translation function and if and only if a result of said verification is positive.

13. The anonymization device of claim 12, further including address translation means configured to replace said source IP address with an IP address of said anonymization device.

14. The anonymization device of claim 12 comprised in:
a BAS, Node Edge, MSAP or PFA type server;
a router;
a PGW type apparatus;
a proxy server;
a recipient gateway type network terminal apparatus;
a recipient server; or
a recipient terminal.

15. The anonymization device according to one of claims 12 to 14 further including an application layer header processing module configured to modify or delete at least one parameter from an application layer header encapsulated in said IP packet.

16. An anonymization system, configured to process a request for anonymization of a source IP address of an IP packet transmitted by a transmitting device to a recipient device via a communications network, said transmitting device being connected to said network via a network terminal apparatus, said anonymization system being positioned for cutting the flow between said network terminal apparatus and said recipient device, and comprising:
the anonymization device according to of claim 12, not having an address translation function; and
an apparatus of said network having an address translation function.

17. A network terminal apparatus configured to request anonymization of a source IP address of an IP packet sent by a transmitting device to a recipient device via a communications network, said transmitting device being connected to said network via said network terminal apparatus, said network terminal apparatus comprising:
a detector configured to detect a configuration to request the anonymization of said source IP address; and
a requester configured to insert, upon said detection, a marking information item in a field of said IP packet, said marking information item being representative of the anonymization request that can be interpreted by an anonymization device, which is positioned for cutting the flow between said network terminal apparatus and said recipient device; and
communication module configured to send said IP packet to said recipient device.

18. The method of claim 5, wherein said request for anonymization of a source IP address of an IP packet further includes:
a request for anonymization of a source port number of said IP packet, the anonymization of said source port number including a modification of said number; and/or
a request for anonymization of a parameter of an application layer header encapsulated in said IP packet, the anonymization of said parameter comprising a modification or deletion of said parameter.

19. The method of claim 5, wherein said request for anonymization of a source IP address of an IP packet includes an anonymization request for:
any IP traffic transmitted by said transmitting device;
any IP traffic transmitted by said transmitting device during the same session as said IP packet;
a traffic generated by an application of said transmitting device; or
any traffic transmitted by all devices connected to said network via said network terminal apparatus.

* * * * *